United States Patent [19]

Kongelka

[11] 4,015,865

[45] Apr. 5, 1977

[54] SAFETY YOKE FOR HIGH PRESSURE GASES

[75] Inventor: Robert M. Kongelka, Washington, Pa.

[73] Assignee: Superior Valve Company, Washington, Pa.

[22] Filed: Feb. 13, 1976

[21] Appl. No.: 657,957

[52] U.S. Cl. .............................. 285/198; 137/316; 285/38; 285/325

[51] Int. Cl.² ....................................... F16L 19/02

[58] Field of Search ................. 285/38, 198, 325; 137/316

[56] References Cited

UNITED STATES PATENTS

| 1,026,066 | 5/1912 | Wolf | 285/198 |
|---|---|---|---|
| 1,484,108 | 2/1924 | Zoltowski | 285/198 |
| 2,169,082 | 8/1939 | Stevens et al. | 285/198 |
| 3,606,390 | 9/1971 | Taylor | 285/DIG. 15 X |

Primary Examiner—Werner H. Schroeder
Assistant Examiner—Conrad L. Berman
Attorney, Agent, or Firm—Buell, Blenko & Ziesenheim

[57] ABSTRACT

This invention relates to a yoke construction for connection to the valve body of a high pressure gas cylinder and the like. More particularly, the invention relates to a yoke construction which will function only when the yoke is correctly connected to a valve body having an identical pin coding and will be inoperative at all other times.

11 Claims, 6 Drawing Figures

SAFETY YOKE FOR HIGH PRESSURE GASES

The distribution of cylinder gases for various purposes is quite common. Such gases are ordinarily compressed to high pressures in cylindrical tanks from which the gases are released, usually through a regulator, for use at lower pressures. Gases commonly shipped in cylinder tanks include oxygen, oxygen-carbon dioxide mixtures, oxygen-helium mixtures, ethylene, nitrous oxide, cyclopropane, helium, and carbon dioxide. The tanks are connected through fittings to a line for use of the gas. Tanks containing a variety of gases are frequently stored and used in close proximity in medical applications.

Tanks for compressed gases are marked with the contents and the tanks are color coded to designate the contents. Nevertheless, there is a risk of mistake in connecting a tank with the result that an unwanted gas may be inadvertently supplied to the point of use. Such a mistake can have consequences which are at best inconvenient and at worst serious. Where the gas is being used for medical purposes, for example, such a mistake can be fatal to a patient. Accordingly, a standard pin code has been adopted for making connection between the body of the valve for the tank and a connecting yoke by which a line or fitting is connected to the valve body. The valve body on the tank is rectangular in cross-section and has a hole drilled into one face which communicates through the valve seat with the interior of the tank. Two pin index holes are drilled into the same face. A yoke carries two pins and an extending nipple which extends into the drilled hole in the valve body. The opposite end of the yoke is connected to a pressure regulator or a line. When the yoke is to be placed over the valve body, a jacking screw is backed off to provide sufficient clearance within the yoke to pass the valve body over the projecting pins and nipple.

If the pins on the yoke are in the same pattern as the holes in the valve body, the yoke can then be pushed toward the valve body. The pins will fit into the pin index holes, and the nipple will fit into the drilled hole in the valve body. The jacking screw, which is located on the opposite side of the yoke from the nipple is then turned down to apply pressure against the adjacent face of the valve body. The screw is turned until a sealing washer surrounding the nipple is compressed between the yoke and the valve body thereby sealing the connection against escape of high pressure gas. The valve can then be opened connecting the cylinder to the regulator or distribution line. Such an arrangement is conventional and is well known to those skilled in the art.

Proper pin coding should ensure that only a yoke and valve body having the same pin index pattern can be connected. In practice, however, there have been failures due to oversight or mistake. Sometimes mismatching has resulted from misuse of the equipment causing the intended safety feature of the pin index to be defeated. Conventionally, the jacking screw requires a large number of turns (say 8–12) to move from open position to the position where it forms a tight connection. Some personnel have attempted to reduce the amount of labor and time required in changing tanks by placing two or even three washers over the nipple. In such a case, the valve body may be lifted clear of the pins, or it may be placed over the wrong pins in an oblique position which will nevertheless form a seal at the washers. Either then, or at a later time, the yoke may then be connected to a tank containing a gas which is not desired.

I provide safety yoke means for connection to a source of high pressure gas. I provide a yoke body having an elongated opening therein with nipple means at one end thereof. I further provide cam means engagable with the yoke body and stem means threadably engaging the cam means and adapted to force a valve body into engagement with the nipple means. I further provide locking means, which cooperate with the cam means and which engage the screw means to prevent rotation relative to the cam when the cam means are not engaged with the yoke body.

In a preferred form of the invention, slots are formed in the yoke body which receive wings on the cam means. Preferably the locking means comprises a flat eccentric washer adjacent the cam means and having a hole through which the stem means passes. The stem means preferably has a circumferential slot into which the washer moves to prevent the stem means from being threaded down into the cam means to apply pressure to a valve body. Also preferably, spring means are provided which urge the cam means toward the nipple means and simultaneously into engagement with the yoke body.

Other details, objects, and advantages of the invention will become apparent as the following description of a present preferred embodiment thereof proceeds.

The accompanying drawings illustrate a present preferred embodiment of the invention in which.

Figure 1:
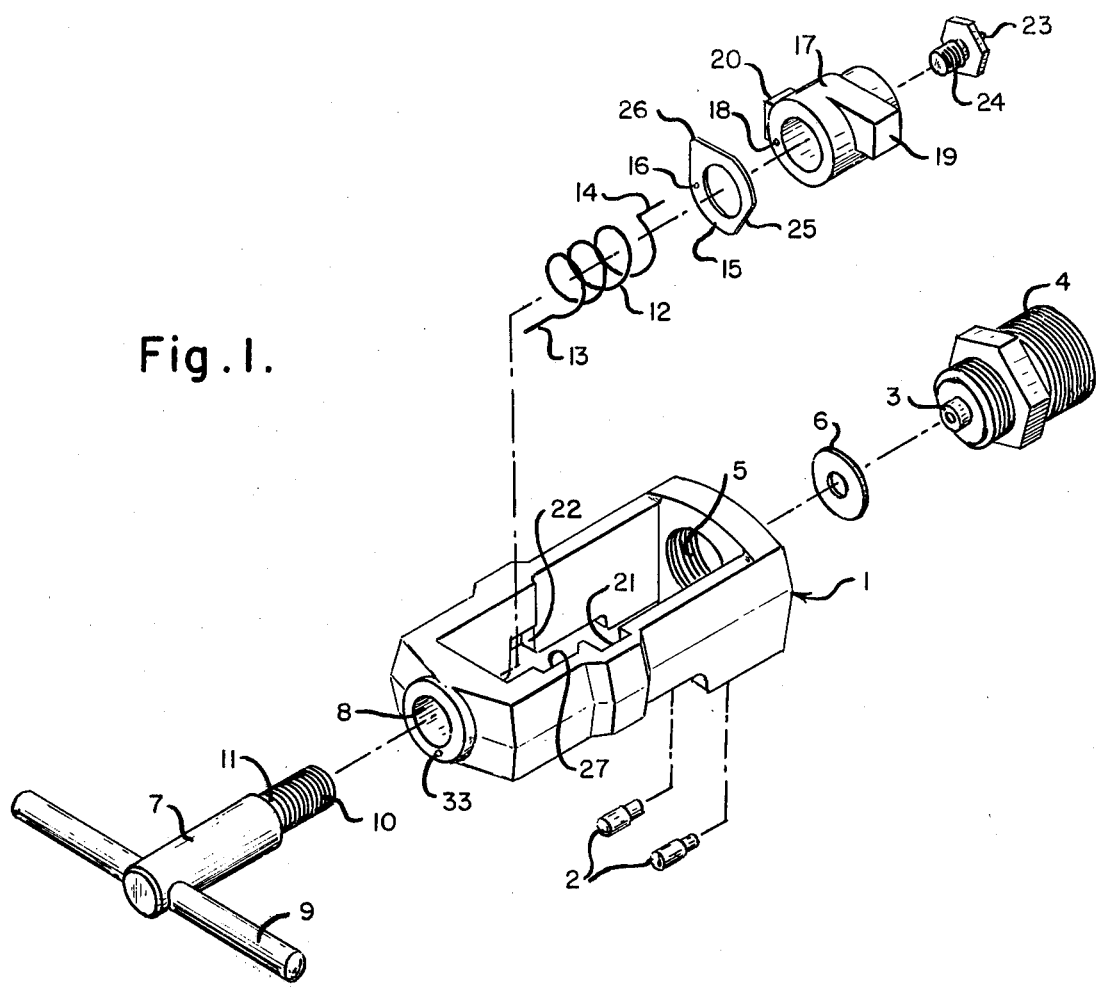
FIG. 1 is an exploded perspective view of the safety yoke.

The yoke comprises a body 1 having two side sections and two end sections which surround an elongated slot. The indexing pins 2 are fitted into one end of the body 1 pursuant to a conventional pin indexing code. The pins are coded to engage appropriate holes in a rectangular valve body when the valve body is inserted through the slot in the yoke. The relationship is conventional and well-known and need not be described further here. A nipple 3 extends from a fitting 4 which is threaded into a hole 5 in one end of the yoke body. A resilient washer 6 surrounds nipple 3 and seals it to the side of the valve body when the yoke is assembled to the valve body.

A jacking stem 7 extends through a smooth bore hole 8 in the opposite end of the yoke body 1 from nipple 1. An operating handle 9 is fitted to the end of stem 7 projecting through hole 8, and the opposite end has a threaded section 10. A section of stem 7 is cut to the base of the thread at the upper end of the thread to form a circumferential slot 11 between the threaded section 10 and the handle end of jacking stem 7. A coil spring 12 surrounds stem 7 and has two projecting ends 13 and 14 which are parallel to the axis of spring 12. An eccentric locking washer 15 fits over stem 7 below spring 12. Locking washer 15 has a hole 16 through which the end 14 of spring 12 extends.

The center hole in locking washer 15 is of slightly larger diameter than stem 7 allowing washer 15 to fit over the unthreaded section of stem 7 between a locking cam 17 and handle 9. Locking washer 15 has a flat 25 on one side and a wing 26 on the opposite side. Cam 17 has a threaded hole passing through it. Cam 17 is threaded onto the threaded end of stem 7. A small hole 18 is drilled into the face of cam 17 closest to handle 9 to receive the end 14 of spring 12. Cam 17 has two wings 19 and 20 which engage slots 21 and 22 when cam 17 is in locked position. A jacking cam nose 23 has a threaded stem which threads into a bore in the end of jacking stem 7. A recess 32 is formed in the end of cam 17 closest to nipple 3. Recess 32 is of sufficient diameter and depth to permit jacking stem nose 23 to be withdrawn into it. The jacking stem nose is larger, however, than the hole passing through cam 17. Yoke body 1 has two recesses formed 27 and 28 into the edge of the yoke body above slots 21 and 22 and separated from the slots by a shoulder. Recesses 27 and 28 receive cam wings 19 and 20 when they are not in slots 21 and 22.

Figure 3:
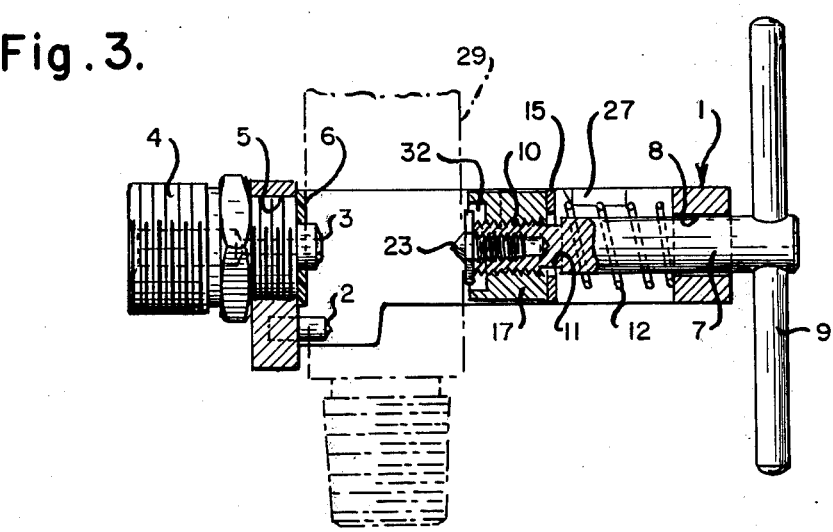
FIG. 3 is a sectional view taken along line III—III of FIG. 2.

A valve body 29 (FIGS. 3 and 4) of the type adapted to be fitted to a high pressure gas tank may be inserted in the yoke between nipple 3 and jacking stem nose 23. The valve includes an outlet port 30 into which the nipple is inserted in conventional fashion and a recess 31 on the opposite face which is intended to receive the point of jacking stem nose 23.

The yoke is assembled with jacking stem 7 passing through hole 8 and threading into the bore of cam 17. Spring 12 is positioned around jacking stem 7. End 14 of spring 12 is inserted through hole 16 in locking washer 15 and into hole 18 in cam 17. End 13 of spring 12 is inserted into hole 33 (FIG. 4) in the end of yoke body 1 adjacent handle 9. Jacking stem nose 23 has a threaded end which threads into a tapped hole in the end of stem 7. Nose 23 is tightened down until it has effectively become unitary with stem 7. The threaded connection between them is for purposes of manufacture and assembly.

Figure 2:
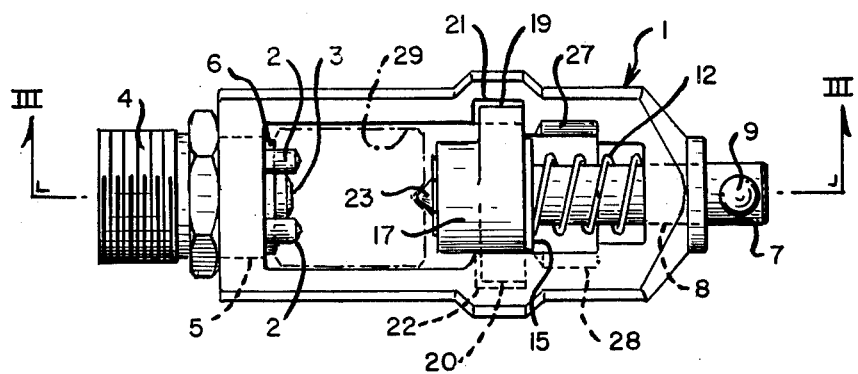
FIG. 2 is a side elevational view of the safety yoke with the cam of the invention engaged and the jacking screw turned down and showing a valve body in dotted outline.
Figure 4:
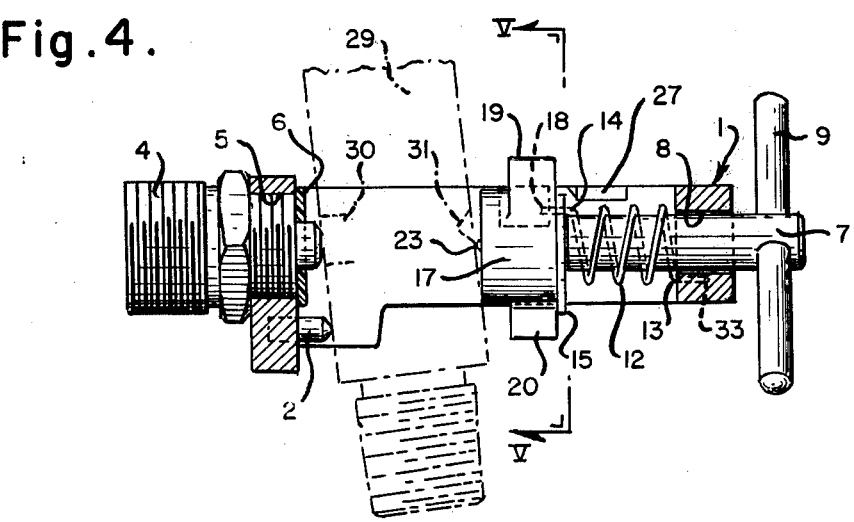
FIG. 4 is a view similar to FIG. 3 with a valve body incorrectly inserted in the yoke.

When jacking stem 7 is turned down, and cam wings 19 and 20 are in slots 21 and 22, cam 17 will be unable to rotate. Accordingly, stem 7 will be threaded into cam 17 causing nose 23 to be extended from recess 32. When wings 19 and 20 of cam 17 are in slots 21 and 22 as shown in FIG. 2, there is insufficient clearance to insert a valve body between the face of cam and index pins 2 and nipple 3. Accordingly, if valve body 29 is within the yoke, it must be correctly located over the pins and nipple before cam 17 can be positioned as shown in FIG. 4. The clearance between the end of cam 17 and a correctly located valve body is less than the thickness of washer 6. Therefore, if two washers 6 are placed over nipple 3 cam 17 cannot be advanced far enough to locate wings 19 and 20 in slots 21 and 22. If a valve body is correctly positioned and cam 17 is positioned with wings 19 and 20 in slots 21 and 21, rotation of jacking stem 7 will cause nose 23 to advance into a recess 31 on the valve body forcing the valve body against washer 6 and forming a gas tight seal.

When it is desired to remove the yoke from the valve body, jacking stem 7 is rotated in the opposite direction. Spring 12 exerts a torsional force upon cam 17 urging wings 19 and 20 into slots 21 and 22. Accordingly, as jacking stem 7 is rotated there will be relative movement between the stem and the cam, and nose 23 will be drawn into recess 32. When nose 23 is fully retracted, it will contact cam 17 preventing further relative rotation between stem 7 and cam 17. Further rotation of stem 7 will rotate cam 17 against the force of spring 12 until wings 19 and 20 are clear of slots 21 and 22. Handle 9 can then be pulled away from yoke body 1 until wings 19 and 20 are aligned with recesses 27 and 28 and can be fitted into the recesses. The yoke can then be removed from the valve body, a new tank and valve body installed and the process repeated.

Figure 5:
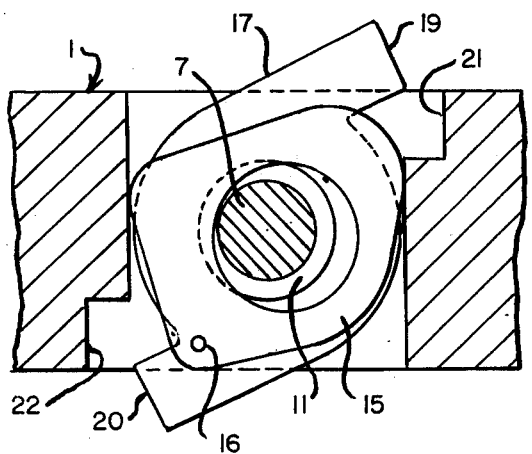
FIG. 5 is a sectional view taken along line V—V of FIG. 4.
Figure 6:
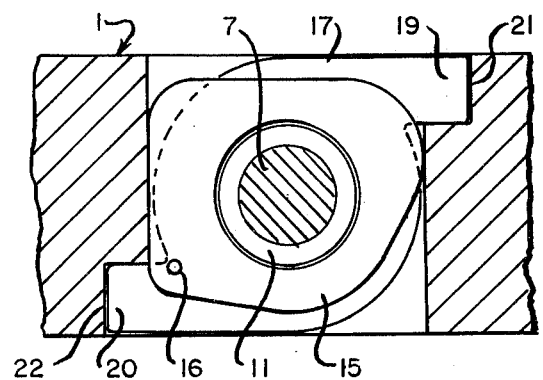
FIG. 6 is a sectional view taken along line VI—VI of FIG. 2.

Hole 16 in washer 15 is held in alignment with hole 18 in cam 17 at all times by spring end 14. When cam 17 is positioned as shown in FIG. 4, the circumferential portions of cam 15 will bear against opposite sides of the yoke body. Those two points of contact and spring end 14 locate washer 15 so that the hole in the center of washer 15 is coaxial with jacking stem 7 (FIG. 6). When cam 17 is withdrawn with wings 19 and 20 in recesses 27 and 28, the cam is in a different angular relationship to yoke body 1. Flat 25 and wing 26 on cam 15 will bear against opposite sides of yoke body 1. Because they are non-circumferential, they will force washer 15 off-center until it is non-axial with stem 7 (FIG. 5). A portion of washer 15 will then be positioned in circumferential slot 11 on stem 7. If an attempt is made to turn down on stem 7, washer 15 which is against the face of cam 17 and is positioned in slot 11 will interfere and prevent stem 7 from threading into cam 17. Thus, cam 17 cannot be threaded down into cam 17 unless cam 17 is first locked into position relative to the yoke with wings 19 and 20 in slots 21 and 22.

If a valve body with an improper pin index is inserted in the yoke as shown in FIG. 4, cam 17 cannot be advanced to locate the wings in the slots. Washer 17 will be off-center and will be jam between the uncut portion of stem 7 and cam 17. Stem 7 cannot then be threaded down and it will be impossible to apply any tightening pressure to valve body 29.

It will be seen from the foregoing that a correctly fitted valve body can be connected and disconnected by only a few turns of jacking stem 7 coupled with a sliding axial movement as wings 19 and 20 are moved between slots 21 and 22 on the one hand and recesses 27 and 28 on the other. If any effort is made to defeat the pin index code, by fitting a valve body obliquely over the pins as shown in FIG. 4 or by building up several washers to the height of the pins, the jacking stem will jam and prevent the stem from being threaded down on the valve body. Since the yoke can be connected or disconnected with only a few turns of the handle there is less incentive to add extra washers for the purpose of reducing the amount of turning required. Also, the limited number of turns required enables the yoke to be switched from one tank to another more quickly.

It is to be understood that the invention is not limited to the foregoing description of a present preferred embodiment but may be otherwise variously practiced within the scope of the following claims.

I claim:

1. Safety yoke means for connection to a source of high pressure gas comprising a yoke body, cam means positioned within the yoke body and having portions adapted to engage the yoke body in locking relationship thereto, screw means threadably engaging the cam means and operable to clamp a valve body against the yoke body, and locking means in cooperative relationship between the cam means and the screw means, said locking means being operable at all times when the cam means are not locked to the valve body and being moved to inoperative position when the cam means are in locking relationship to the yoke body.

2. The safety yoke means of claim 1 in which the yoke body includes slots and the cam body has wings which are rotatable into said slots to engage the cam against axial movement relative to yoke body.

3. The combination of the safety yoke means of claim 1 and a valve body engaged therewith in correct engagement with indexing pins in the yoke.

4. The safety yoke means of claim 1 in which the locking means comprises a flat washer pivotally connected to the cam means whereby rotation of the cam means causes the washer to move between locking and non-locking positions.

5. The safety yoke means of claim 4 in which the washer has circumferential and non-circumferential portions which bear against the yoke body when the washer is in non-locking and locking positions, respectively.

6. The safety yoke means of claim 4 in which the screw means includes a slotted section into which the washer moves when it is in locking position.

7. The safety yoke means of claim 4 in which spring means are located to surround the stem means and urge the cam means toward the nipple means and simultaneously urge the cam means into locking engagement with the yoke body.

8. Safety yoke means for connection to a source of high pressure gas comprising a yoke body having an elongated opening therein, nipple means at one end of the opening, slot means formed in the yoke body adjacent the opening and intermediate the ends, stem means slidably positioned in the yoke body at the opposite end from the nipple means, cam means threadably engaging the stem means and having portions adapted to engage the slot means, and locking means in cooperative relationship with the cam means to lock the stem means against threading into the cam means at all times when the cam means are not in locking engagement to the yoke body.

9. The safety yoke means of claim 8 in which there is just sufficient clearance to move the cam means into engagement with the yoke body when a valve body is correctly positioned in the yoke without misalignment.

10. The safety yoke means of claim 8 in which the stem means has a circumferential slot to receive the locking means.

11. The safety yoke means of claim 10 in which the locking means comprises a flat eccentric washer which is pivotally attached to the cam means, bears against the valve body, and surrounds the stem means whereby rotation of the cam means relative to the valve body moves the washer between locking and non-locking positions.

* * * * *

UNITED STATES PATENT OFFICE
CERTIFICATE OF CORRECTION

Patent No. 4,015,865          Dated April 5, 1977

Inventor(s) ROBERT M. KONGELKA

It is certified that error appears in the above-identified patent and that said Letters Patent are hereby corrected as shown below:

Column 2, line 59, "nipple 1" should read --nipple 3--.

Column 3, line 60, "21" (second occurrence) should read --22--

Signed and Sealed this

*Twenty-fifth* Day of *October 1977*

[SEAL]

*Attest:*

RUTH C. MASON        LUTRELLE F. PARKER
*Attesting Officer*     *Acting Commissioner of Patents and Trademarks*